Figure 1:
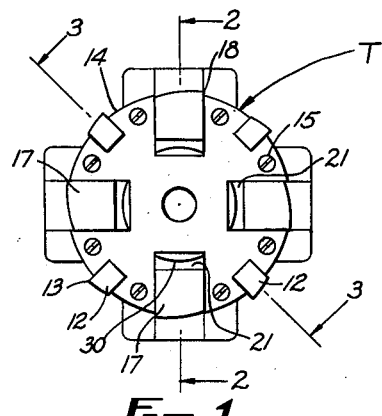

Nov. 4, 1952 — H. D. STECHER — 2,616,103
METHOD OF BORING AND TAPPING
Filed Feb. 8, 1947 — 2 SHEETS—SHEET 1

INVENTOR
HENRY D. STECHER

ATTORNEYS

INVENTOR
HENRY D. STECHER
BY
ATTORNEYS

Patented Nov. 4, 1952

2,616,103

UNITED STATES PATENT OFFICE 2,616,103

METHOD OF BORING AND TAPPING

Henry D. Stecher, Lakewood, Ohio

Application February 8, 1947, Serial No. 727,405

2 Claims. (Cl. 10—1)

This invention relates to forming threads and more particularly to an improved method and means for preparing a surface to be threaded and/or forming threads in such surface in an improved way and with improved expedition. More specifically my invention comprehends an improved method and means for boring and tapping, including boring in one stroke and tapping on the return stroke thereby eliminating idle strokes and producing more perfect and desirable threads.

When using screw thread chasers or taps it is known to first bore or pass a reaming cutter over the surface on which the thread is to be formed to remove any scale or work or finish the surface to the desired dimensions prior to the thread cutting operation. After such boring or reaming stroke the cutter, according to prior practice, is removed from the hole and a tap or threading chaser is advanced into the hole and the thread cut on the surface thereof from the mouth to the bottom of the bored or reamed hole. In threading holes in this manner various problems and disadvantages have been endured which it is the object of the present invention to solve and overcome.

One such disadvantage is the time lost in withdrawing the cutting tool for insertion of the tap or thread chasing tool and then in withdrawing that tool at the end of the thread cutting operation. This lost time assumes significant values, particularly in quantity production work. In prior threading operations where the taps or thread chasers began their cut at the mouth of the hole, the axial load of advancing the tap was imposed on the first partially formed threads at the mouth of the hole where they were often broken or imperfectly formed. Since the utility of the finished product often depends upon the perfection of the threads at the mouth of the tapped hole and since the best threads are formed after many of the teeth of the tap or chaser are fully engaged, my invention proceeds oppositely of the teachings of the prior art by beginning to form the threads at or near the bottom of the hole to be tapped prior to or at least simultaneously with the forming of threads adjacent the mouth of the hole. In this way the material of the work piece adjacent the mouth of the hole is relieved of its time-honored burden and disadvantage above mentioned and on the contrary is preserved and treated in a manner to insure the perfection of the threads where most perfect threads are most to be desired. Within the precepts of my invention the boring or reaming operation is followed immediately, without interrupting the rotation of the workpiece and without axial movement of the tool, by a radially outward movement of thread chasers, the forward most teeth of which are disposed adjacent the bottom of the hole to be tapped. In this way and by the number and form of the teeth of the chasers and the relation thereof to the surface to be threaded I can selectively determine the tapping load and the order and place in which threads will first be cut to full depth. Withal I can bring a large number of chaser teeth into load bearing and cutting contact with the surface in the first instance and have a wide multiple tooth engagement in the threaded surface in fully formed threads for driving the chaser out of the hole until and after the last thread at the mouth of the hole is fully formed.

It is among the objects of my invention to solve the problems and attain the results above discussed. It is also among the objects of my invention to provide an improved method and apparatus for cutting threads. Another object is to provide a method and apparatus by which a surface to be threaded is first bored on a feeding stroke of either a tool or workpiece parallel to their axis of relative rotation, whereupon threads are then cut in the bored surface whilst the work and tool then next have opposite axial motion. A further object of the invention is to provide a method and apparatus for forming threads rapidly and effectively by a single cut of a threading tool in a hole in such manner that the finished thread is of uniform and substantially complete configuration all the way from the bottom to the mouth of the tapped hole. A further object is to form an internal thread in a hole with a thread chaser which is effectively self-ejecting from the time of its first contact with the workpiece. A still further object is to provide a combined boring and tapping tool in which the bits and chasers may be moved radially of each other to permit alternate employment thereof upon changes in axial motion of the tool. Other objects are to provide higher tapping speeds, more even distribution of load and wear on chaser teeth and faster axial tap movement without deleterious burdens or effects on fully or partially cut threads in the work.

Figure 2:
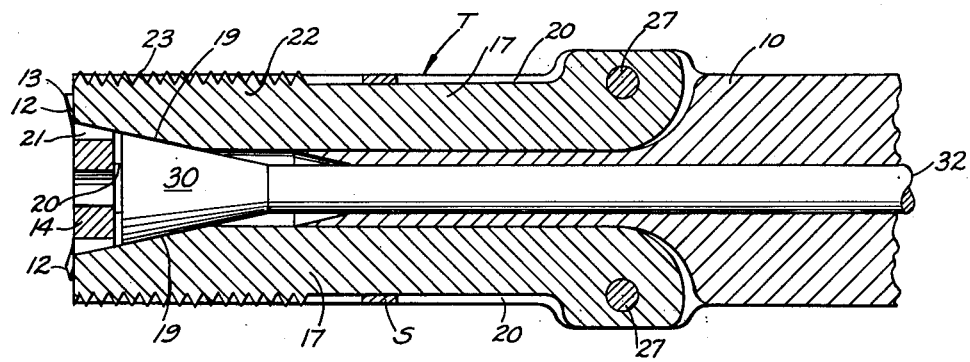
Figure 3:
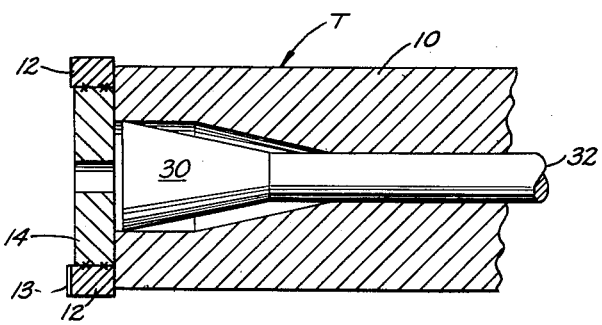
Figure 4:
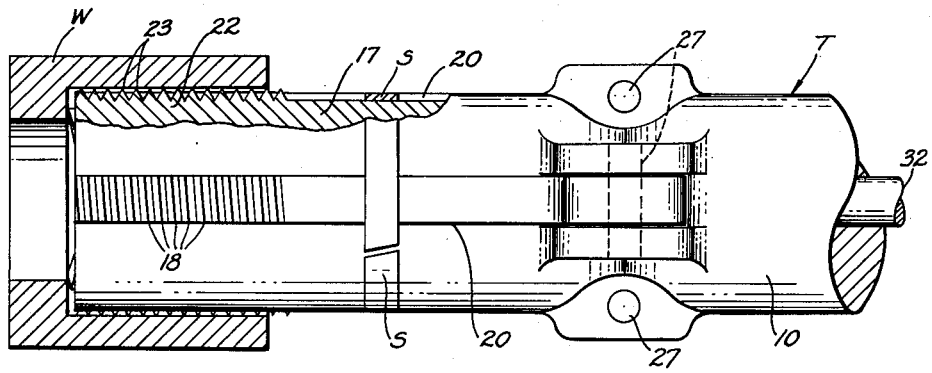
Figure 5:
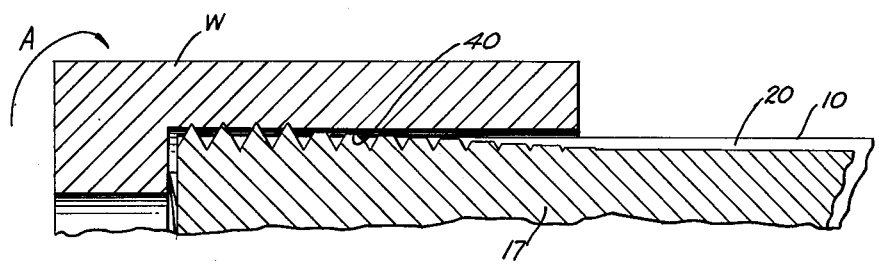
Figure 6:
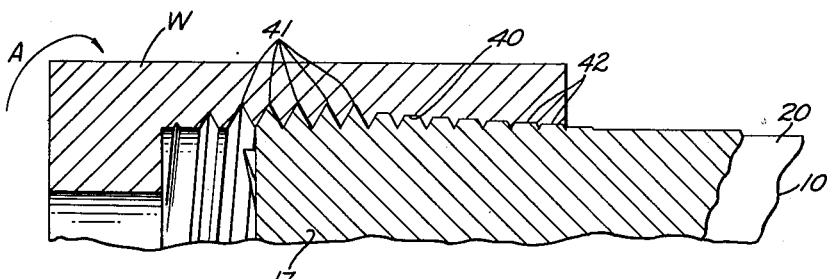

Other objects of the invention will appear from the following description of a preferred form of my invention, reference being had to the accompanying drawings in which Figure 1 is an end elevation of my improved boring and threading tool embodying one form of the present invention. Figure 2 is a longitudinal section through the tool of Figure 1 as indicated by the lines 2—2 thereon. Figure 3 is a longitudinal section through the tool of Figure 1 as indicated by the lines 3—3 thereof. Figure 4 is a longitudinal section through a workpiece showing the tool in partly broken elevation, the sections being taken in a plane passing through the axis of rotation of the workpiece and tool relative to each other. Figure 5 is an enlarged fragmentary longitudinal section through a part of the workpiece and a chaser at or about the instant of contact between the chaser teeth and the surface to be threaded; a modified form of chaser teeth being shown. Figure 6 is a view similar to Figure 5 showing the same parts in the relation assumed by them during the thread cutting operation after a few revolutions have taken place between the workpiece and the chaser.

Referring now to Figures 1, 2 and 3, a preferred form of the tool T of my invention comprises a generally cylindrical hollow steel body 10 shaped at one end, rightwardly as viewed and not shown, to fit into the chuck or other tool holder, not shown, of a machine in which it is to be mounted. When in operation the tool may be held non-rotatable with respect to the machine and the workpiece rotated or the workpiece may be held stationary and the tool rotated. My invention is deemed to cover both conditions of use. In the form of invention illustrated herein the workpiece W, Figs. 4, 5 and 6, is considered to rotate with respect to the tool and the machine, and the tool T is moved and/or moves without rotating along the axis of rotation of the workpiece, into and out of the workpiece.

The tool T carries both boring bits or cutters 12, Figs. 1 and 3, as well as thread chasers 17, Figs. 1, 2 and 4 alternately and peripherally spaced around the tool wherewith upon radial retraction of the chasers the boring bits 12 alone have operative engagement with the work, but upon radially outward expansion of the chasers the teeth of the chasers will lie radially outward of the cutting edges of the boring bits wherewith to act upon the work at a greater radius than that of the boring bits and form threads in the bored surface. Preferably the boring is accomplished by four cutters or bits 12 spaced 90° apart about the periphery of the tool at the extreme forward end thereof and mounted, as shown in Figs. 1 and 3 in an end plate or disc 14 removably secured as by screws 15 to the forward end of the tool body 10; the forward transverse face of the plate, leftward as viewed in Figs. 2 and 3, forming the forward end of the tool; the radial parts of the cutting edges 13 of the bits 12 lying a little forwardly of the face of the plate 14. The bits are formed with the circumferential parts of their cutting edges 13 extending beyond the outer annular and forward surfaces of the plate 14 and beyond the corresponding annular surface of the body 10 in order that each bit may project beyond the exterior surfaces of the tool and bore out the wall of the hole into which the tool is inserted.

The bits 12 are positioned so that their cutting edges 13 face circumferentially in the same direction as cutting edges 18 of the chasers 17 so that both instrumentalities may act in direct sequence without stopping or changing direction of rotation of the work. When right hand threads are to be cut the chaser teeth must cut in the "left-hand" direction to take cognizance of the "backing out" movement of the tap while it is cutting. As viewed in Fig. 4 the cutting edges 18 of the chaser teeth will cut right hand threads from the bottom to the mouth of the hole in the work W when the tool T is held against rotation and the work is rotated clockwise as viewed from the right, i. e., as viewed facing the mouth of the hole in the work. The hole may be cut or reamed to the limit of its desired depth by virtue of the fact that the bits 12 are at the foremost end of the tool. When the bits become dull or otherwise in poor operating condition the plate 14 may be easily removed as by taking out the screws 15 and the bits replaced or reground as necessary.

After the bits 12 have bored out the surface of the hole and the tool has been advanced to its most inwardly position as shown in Figure 4 the thread chasers 17 are brought into action to form the desired thread as the axial motion of the tool is reversed. This is accomplished by forcibly shifting the chasers radially outwardly to cause them to bite into the work surface to an ultimate depth equal to the desired depth of thread. In the fully extended threading position the root circles of the chasers will lie substantially in a cylinder coincident with the freshly bored cylindrical surfaces of the hole, and thus it is not necessary to retract the bits because they merely pass idly over the tops of the threads as the latter are being cut by the chasers upon the reverse axial movement of the tool.

Preferably four thread chasers 17 are provided, mounted in four longitudinally extending slots 20 in the body 10 which are spaced circumferentially between the bits 12. The plate 14 is correspondingly recessed as at 21 to permit the thread chasers 17 to extend to substantially the foremost end of the tool to terminate substantially in the radial plane of the forward end of the tool in order that the threads formed may extend substantially to the bottom of the bored hole. Each of the thread chasers is provided with a thread cutting portion 22 in which all the cutting teeth 23 preferably are identical, Figs. 2 and 4, and in which taper, if any, is provided, preferably by axial inclination of the row of teeth with respect to the body of the chaser in relation to the points 27 of pivotal support for the chasers.

To permit the chasers 17 to be shifted radially outwardly away from the tool axis or to be retracted inwardly each chaser is pivotally mounted on a pin 27 spaced rearwardly from the forward end of the tool, Figs. 2 and 4. All the chasers 17 are swung outwardly simultaneously and uniformly about their center pins 27 to thread cutting position by the cam action of an axially movable conical cam 30. The cam is shifted axially back and forth along the tool axis within the hollow body 10 by a rod 32 that in turn is reciprocated in any well-known manner either manually or automatically by mechanism, not shown, carried in the machine in which the tool is mounted. As the rod 32 is pulled to the right, Figs. 2 and 4, relative to the chasers and the body of the tool the camming action of the cam 30 acting on the inclined surfaces 19 of the chasers 17 forces them outwardly about their pivots 27 into thread cutting engagement with the workpiece and holds them there during the tapping operation. A retracting spring S, preferably taking the form of a tempered split steel ring, is disposed in an annular external groove in the body 10 and overlies all the chasers, constraining them to move radially inwardly against the action of the cam

10 and holding the chasers in retracted position, Figs. 2 and 4, except when the cam forces them outwardly to threading position against the yielding resistance of the spring S.

The axial angular position with respect to the surface to be threaded and the line of the tops of the teeth on each chaser is determinable by the distance the teeth lie from the pivotal axis at the pins 27 and partially by the axial angle, if any, at which the chaser teeth lie on the chaser and come into contact with the work. In a preferred form, Figs. 2 and 4, the teeth of the chasers 17 may all be identical and so formed and disposed that all of them initially contact the work surface substantially simultaneously when the chasers are shifted into threading position, and at full cutting position make cuts of substantially equal depth throughout. In another form, not specifically shown, but see Figs. 5 and 6, it may be desired to set uniformly shaped chaser teeth at such an axial angle that those closest the pivot point do not take a full cut and the thread is not completed until the teeth farthest from the pivot pass through the thread. In certain cases this is of advantage because it provides a graduated increase in cut as the threads are formed during withdrawal of the tool. This last mentioned modification is carried out a step farther in the form shown in Figs. 5 and 6 wherein everything is the same as above described except that the chaser teeth 40 are graduated with the full teeth at the forward end whereby to begin to cut at the bottom of the hole; the teeth of diminishing size disposed at and/or toward the mouth of the hole.

In Fig. 5 the parts are shown with the tool at substantially its innermost, i. e., foremost, position; the chasers 17 having begun their radial outward movement bringing the tops of the four foremost and fully formed teeth into thread cutting engagement with the work. At substantially the same or at an adequately previous time the axial, leftward as viewed, force on the tool by which the boring bits were advanced into the work will have been relieved to permit the chaser teeth by their engagement with the work to initiate the retraction or expulsion of the tool from the work. In Figure 6 the parts are shown in the position they will have assumed after a revolution or so of the work relative to the tool in the direction suggested by the arrow A. All the chaser teeth in the hole have come to full cutting engagement; the several teeth sharing the cutting load according to their shapes and proportions and all acting to screw the tool axially out of the work. At this point full depth threads will have begun to be cut near the bottom of the hole as at 41 and the threads near the mouth of the hole will be in process of progressive formation as at 42. As the tap continues its outward, i. e., rightward, movement the larger teeth will take increasingly deeper cuts at and adjacent the mouth of the hole until the first of the fully formed teeth to reach the mouth takes its full depth cut. The remaining fully formed teeth will have full threaded engagement with the newly formed threads with adequate load bearing contact to maintain the axial movement of the tool without overstressing any of the threads wherewith to leave substantially perfect threads throughout and particularly at the mouth of the hole.

A factor that bears on the depth to which the hole may be completely threaded when following the teaching of my invention is the speed with which the cam 30 is moved to push the thread chasers outwardly. Due to the fact that the workpiece and chasers are preferably in rotation relative to each other at the time the threading operation is begun the instant the chasers bite into the work surface they begin to feed outwardly along the tool axis due to the reverse lead of the cutting teeth. As a result a theoretically complete full depth thread will be formed at the very bottom of the hole only after the foremost chaser teeth are moved outwardly to full cutting depth incident to enough relative rotative movement between the teeth and the work to facilitate the cut. As a practical matter about a full term or so between the work and the teeth will develop full depth threads when accompanied by reasonably rapid outward movement of the chasers. In all events my invention facilitates the formation of complete fully formed threads quite closely adjacent the bottom of the hole and well formed, if not full depth threads substantially all the way to the bottom of the hole. The speed of rotation between the parts and also the speed at which the chasers can be expanded into thread cutting position are advantageously made dependent upon the number of full depth teeth on the chasers and the material being threaded as compared to the character of the bits and chasers. For example, using carboloy bits and steel chasers to bore and tap insulating bushings made of a composition of Bakelite and paper the operations can be performed with much ease and rapidity and the chasers can be moved rapidly outwardly to full thread cutting position in but one or two revolutions of the work if so desired. When the invention is used in threading tougher material it will be apparent from the teachings hereof how advantageous accommodation should be made thereto.

After the thread chasers 17 have been expanded outwardly and begin to cut the thread they may act as self-feeders to move the tool and also expel it from the hole, as mentioned above, but I do not exclude a positive withdrawal of the tool at a proper speed equal to the pitch of the threads. After the tool is removed or expelled from the hole the cam 30 is shifted to the left, Fig. 4, and spring S returns the chasers 17 back into their slots 20 to lie at about or slightly below the outer annular surface of the body 10 and are then ready for the next entry and boring stroke of the tool.

Motion of the cam 30 relative to the chasers may be controlled manually or automatically as mentioned above to provide the expansion of the chasers in appropriately timed relation to the axial movement of the tool and in proper correlation to the application of the feeding force for the boring stroke and the release thereof for the return tapping stroke. Generally speaking I prefer to adapt the speed of rotation of the work to the requisites of tapping and then correlate the rate of feed of the boring bits to the situation. That is to say, if I find it practicable to tap a given workpiece at a given R. P. M., then for a given depth of boring cut the boring cutters will be fed axially at a rate that is efficient at the given R. P. M. of the workpiece. While I prefer that the work rotate at a constant and continuous speed from the beginning of the boring to the end of the tapping operations it is not without my teaching to modify the speed between operations, as may be done with ease by letting the tool dwell in its foremost position and changing the speed of the work before expanding the chasers.

In tapping in accordance with my invention the thread cutting as well as the screwing or axial load on the chaser teeth is more widely and evenly distributed than obtains when the tap is moved inwardly of the hole to be tapped. In the latter instance, according to prior and conventional practice, the foremost teeth do all the work at first at the mouth of the hole and always have a full thread cutting load throughout the whole cutting operation. The more even distribution of load among the chaser teeth in my invention reflects a corresponding elimination of concentrated burdens upon any one or more of the teeth, and threads, and therefore reduces wear and permits higher tapping speeds, longer life for the chasers and better threads withal. The higher tapping speed with more rapid rotation of the work relative to the tool permits a faster boring and reaming operation wherewith my invention not only saves in terms of eliminating idle tool strokes but enhances the speed of doing work on the working strokes.

While I have illustrated and described a preferred and certain modified forms of my invention, other changes and modifications and improvements therein will occur to those skilled in the art who come to understand the precepts of my invention, and I do not intend to be limited in the scope of my patent to the particular form or forms of my invention herein specifically illustrated and described nor in any manner other than by the claims appended hereto.

I claim:

1. The method of boring and tapping which consists in continuously rotating the work at a substantially constant speed in a given direction of rotation, boring out a generally cylindrical hole to substantially the minimum diameter of the threads to be tapped progressively from the mouth to the bottom of the hole while advancing a collapsed tap axially of the hole to the bottom thereof, expanding the tap into thread cutting engagement with diametrically opposite portions of the freshly bored surface at the bottom of the hole, cutting full threads substantially adjacent the bottom of the hole and partial threads toward the mouth of the hole oppositely of the direction of the pitch of the threads (as by cutting counter-clockwise of the work with a tap for a right hand thread) whereby the tap propels itself axially out of said hole with the cutting of the threads, and continuing the cutting of threads to substantially full finished depth progressively from the bottom to the mouth of the hole, all of said steps being performed without in the meanwhile withdrawing the tap from the work.

2. The method according to claim 1 in which portions of said tap are pivotally expanded about axes remote from the free end of the tap into thread-cutting engagement with the freshly bored surface.

HENRY D. STECHER.

REFERENCES CITED

The following references are of record in the file of this patent:

UNITED STATES PATENTS

| Number | Name | Date |
|---|---|---|
| 330,999 | Nugent | Nov. 24, 1885 |
| 391,777 | Buck | Oct. 30, 1888 |
| 533,585 | Ekehorn | Feb. 5, 1895 |
| 947,727 | Baker | Jan. 25, 1910 |
| 1,012,091 | Markland | Dec. 19, 1911 |
| 1,114,158 | Lovell | Oct. 20, 1914 |
| 1,392,203 | Nelson | Sept. 27, 1921 |
| 1,494,464 | Creassey | May 20, 1924 |
| 2,060,949 | Pace | Nov. 17, 1936 |
| 2,114,626 | Brinkman | Apr. 19, 1938 |
| 2,441,580 | Mageoch | May 18, 1948 |